USO11503762B2

(12) United States Patent
Kaskawitz et al.

(10) Patent No.: US 11,503,762 B2
(45) Date of Patent: Nov. 22, 2022

(54) SHUTTER ASSEMBLY FOR A LAWNMOWER, LAWNMOWER HAVING SAME, AND CONVERTIBLE LAWNMOWER

(71) Applicant: Honda Motor Co., Ltd., Tokyo (JP)

(72) Inventors: Scott J. Kaskawitz, Hillsborough, NC (US); Christopher Kurt Zingelmann, Jr., Raleigh, NC (US); Tyler I. Ricketts, Haw River, NC (US); Surender Kumar, Mebane, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 1005 days.

(21) Appl. No.: 16/204,634

(22) Filed: Nov. 29, 2018

(65) Prior Publication Data

US 2020/0170185 A1 Jun. 4, 2020

(51) Int. Cl.
*A01D 34/00* (2006.01)
*A01D 34/71* (2006.01)
*A01D 34/81* (2006.01)
*A01D 34/68* (2006.01)
*A01D 101/00* (2006.01)

(52) U.S. Cl.
CPC .......... *A01D 34/71* (2013.01); *A01D 34/005* (2013.01); *A01D 34/68* (2013.01); *A01D 34/81* (2013.01); *A01D 2101/00* (2013.01)

(58) Field of Classification Search
CPC .. A01D 2101/00; A01D 34/005; A01D 34/71; A01D 34/68; A01D 34/81; A01D 34/49
See application file for complete search history.

(56) References Cited

U.S. PATENT DOCUMENTS 5,826,416 A 10/1998 Sugden et al.
6,073,305 A * 6/2000 Hesskamp .......... F04D 29/4246
15/405

(Continued)

FOREIGN PATENT DOCUMENTS

CN 1446447 A 10/2003
CN 101904246 A 12/2010
(Continued)

OTHER PUBLICATIONS

Chinese Office Action for the related Chinese Patent Application No. 201911145624.1 dated Oct. 28, 2021.

*Primary Examiner* — Adam J Behrens
(74) *Attorney, Agent, or Firm* — Kenealy Vaidya LLP

(57) ABSTRACT

A shutter assembly for a lawnmower includes a steel cutter housing, a shutter, and a lever. The cutter housing can include a cutter housing slot passing through the cutter housing. The shutter can be rotatably attached to the cutter housing so as to be movable between: a first shutter position in which a blocking panel of the shutter is positioned such that the blocking panel opens the discharge opening; and a second shutter position in which the blocking panel is positioned such that the blocking panel closes the discharge opening, and the second shutter position corresponds to a mulching position. The lever can be attached to the shutter and can extend through the cutter housing slot. The cutter housing slot can be configured to limit movement of the lever such that a range of motion of the blocking panel extends from the first shutter position to the second shutter position.

17 Claims, 10 Drawing Sheets

(56) References Cited

U.S. PATENT DOCUMENTS

| | | | |
|---|---|---|---|
| 6,735,932 B2 | 5/2004 | Osborne | |
| 6,751,937 B2* | 6/2004 | Kobayashi | A01D 42/005 56/202 |
| 6,843,048 B2* | 1/2005 | Osborne | A01D 42/005 56/320.2 |
| 6,862,875 B2* | 3/2005 | Iida | A01D 34/71 56/320.2 |
| 7,249,450 B2* | 7/2007 | Iida | A01D 34/71 56/320.2 |
| 7,367,174 B2* | 5/2008 | Grimwade | A01D 42/005 56/2 |
| 7,805,920 B2* | 10/2010 | Hurst | A01D 43/063 56/320.2 |
| 7,866,135 B2 | 1/2011 | Davis et al. | |
| 8,132,396 B2* | 3/2012 | Minami | A01D 42/005 56/320.2 |
| 8,234,849 B2* | 8/2012 | Shimozono | A01D 42/005 56/320.2 |
| 9,043,957 B2* | 6/2015 | Kaskawitz | A01D 34/005 |
| 9,066,469 B2* | 6/2015 | Kimura | A01D 42/005 |
| 9,699,963 B2* | 7/2017 | Ressler | A01D 42/005 |
| 2003/0182915 A1* | 10/2003 | Kobayashi | A01D 34/71 56/202 |
| 2003/0182916 A1* | 10/2003 | Iida | A01D 42/005 56/202 |
| 2003/0217542 A1* | 11/2003 | Osborne | A01D 42/005 56/320.1 |
| 2010/0307123 A1 | 12/2010 | Minami et al. | |
| 2013/0097987 A1* | 4/2013 | Kaskawitz | A01D 42/00 56/320.2 |
| 2014/0318099 A1* | 10/2014 | Thorman | A01D 42/005 56/320.2 |

FOREIGN PATENT DOCUMENTS

| | | |
|---|---|---|
| CN | 104641786 A | 5/2015 |
| CN | 104871719 A | 9/2015 |
| EP | 2875713 A1 | 5/2015 |
| WO | WO9749276 A1 | 12/1997 |

* cited by examiner

SHUTTER ASSEMBLY FOR A LAWNMOWER, LAWNMOWER HAVING SAME, AND CONVERTIBLE LAWNMOWER

BACKGROUND

Lawnmowers can be configured as garden tractors, riding mowers, commercial walk-behind mowers and smaller walk-behind mowers. Smaller walk-behind mowers can include a prime mover mounted to the deck of the lawnmower. Mower decks associated with garden tractors, riding mowers and commercial walk-behind mowers can be removably attached to the frame of these self-propelled machines. More than one blade can be mounted in the cutting chamber of the deck for any of these embodiments of a lawnmower.

Lawnmowers can be configured to either mulch clippings, which are generated as mowing is performed, or to discharge the clippings through a discharge chute. Mulching mowers cut the clippings into fine particles and blow the clippings back into the lawn. Discharge mowers either discharge the clippings directly onto the lawn surface or into a bag that is attached to the lawnmower. The clippings can then be disposed of elsewhere. Some lawnmowers can be converted between mulching lawnmowers and discharge lawnmowers by inserting or removing a removable conversion assembly mounted within the cutter housing and/or the discharge chute such that the operator of the lawnmower removes or installs the removable assembly in order to place the lawnmower in the discharge mode and the mulching mode, respectively. Instead of a removable conversion assembly, some lawnmowers have a movable mulching assembly that remains mounted within the cutter housing and/or the discharge chute and is movable by the operator of the lawnmower between a mulching position and a discharging position within the cutter housing. Some mulching systems are variable mulching system in which one or more movable components can be moved into any one of a plurality of positions between the mulching position and the discharging position such that some of the clippings are mulched and some of the clippings are discharged, via the discharge chute, into a collection bag or onto the ground.

SUMMARY

Some embodiments are directed to a shutter assembly for a lawnmower that includes a cutter housing, a shutter, and a lever. The cutter housing can be made of steel and can include a discharge opening and a cutter housing slot passing through the cutter housing. The cutter housing slot can have a first end and a second end. The shutter can include a blocking panel. The shutter can be rotatably attached to the cutter housing so as to be movable between (a) a first shutter position in which the blocking panel is positioned such that the blocking panel opens the discharge opening, and (b) a second shutter position in which the blocking panel is positioned such that the blocking panel closes the discharge opening, and the second shutter position corresponds to a mulching position. The lever can be attached to the shutter and can extend through the cutter housing slot. The lever can be engageable by a user so as to move the shutter between the first shutter position and the second shutter position. The cutter housing slot can be configured to limit movement of the lever such that a range of motion of the blocking panel extends from the first shutter position to the second shutter position.

Some embodiments are directed to a lawnmower that can include a shutter assembly and a prime mover. The shutter assembly can include a cutter assembly, a shutter, and a lever. The cutter housing can include a discharge opening and a cutter housing slot. The shutter can include a blocking panel. The shutter can be rotatably attached to the cutter housing so as to be movable between (a) a first shutter position in which the blocking panel is positioned such that the discharge opening is opened by the blocking panel, and (b) a second shutter position in which the blocking panel is positioned such that the discharge opening is closed by the blocking panel, and the second position corresponds to a mulching position. The lever can be attached to the shutter and can extend upwardly through the cutter housing slot. The lever can be engageable by a user so as to move the shutter between the first position and the second position. The prime mover can be mounted on the cutter housing and can be configured to rotate a blade for cutting vegetation.

Some embodiments are directed toward a convertible lawnmower that can be converted between a discharging mode and a mulching mode. The lawnmower can include a cutter housing, a collection bag, a shutter, and a lever. The cutter housing can include a discharge opening, a discharge chute in communication with the discharge opening, and a cutter housing slot in the cutter housing. The collection bag can be removably connected to the cutter housing and configured to receive vegetation clippings passing through the discharge opening when the lawnmower is in the discharging mode. The shutter can include a blocking pane. The shutter can be rotatably attached to the cover so as to be movable between (a) a first shutter position in which the blocking panel is positioned such that the discharge opening is opened by the blocking panel and the vegetation clippings are directed through the discharge opening and toward the collection bag when the collection bag is connected to the discharge chute, and (b) a second shutter position in which the blocking panel is positioned such that the discharge opening is closed by the blocking panel, and the second position corresponds to a mulching position. The lever can be attached to the shutter and can extend upwardly through the cutter housing slot. The lever can be engageable by a user so as to move the shutter between the first position and the second position. The slot can delimit movement of the lever between a first lever position and a second lever position such that the shutter is in the first shutter position when the lever is in the first lever position and the shutter is in the second shutter position when the lever is in the second lever position.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Some mulching assemblies that remain mounted in the cutter housing of the lawnmower can include many components, which can result in a labor-intensive assembly for manufacturing. Thus, the manufacturing cost can increase as compared to a lawnmower that includes a removable conversion assembly. However, the operator can perceive the removal and installation processes of the removable conversion assembly as inconvenient. Thus, there is a need for a mulching assembly that can reduce the manufacturing cost and lessen or avoid any inconvenience perceived by the operator when converting the lawnmower between the discharge mode and the mulching mode.

Figure 1:
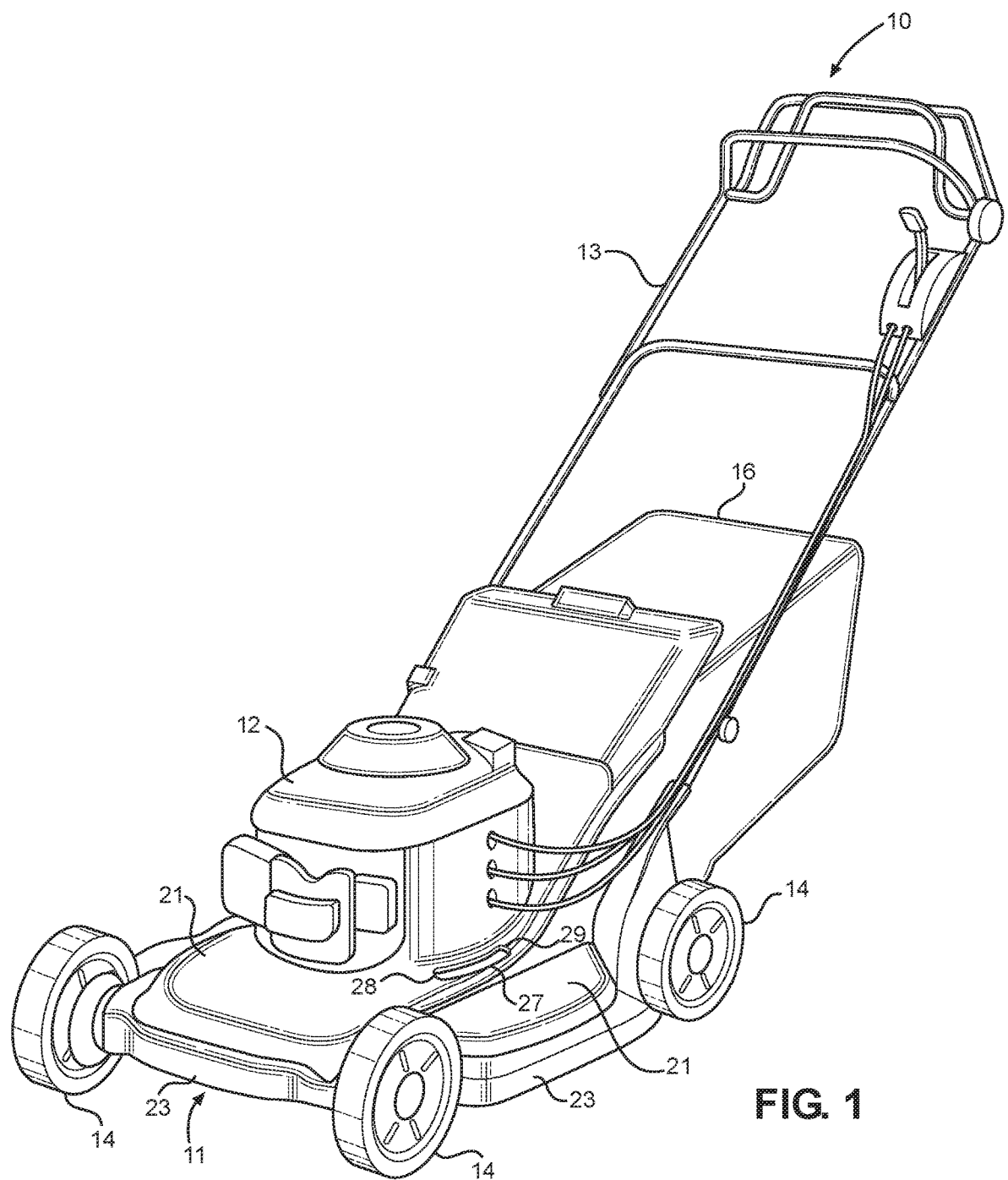
FIG. 1 is a perspective view of a lawnmower in accordance with the disclosed subject matter.
Figure 2:
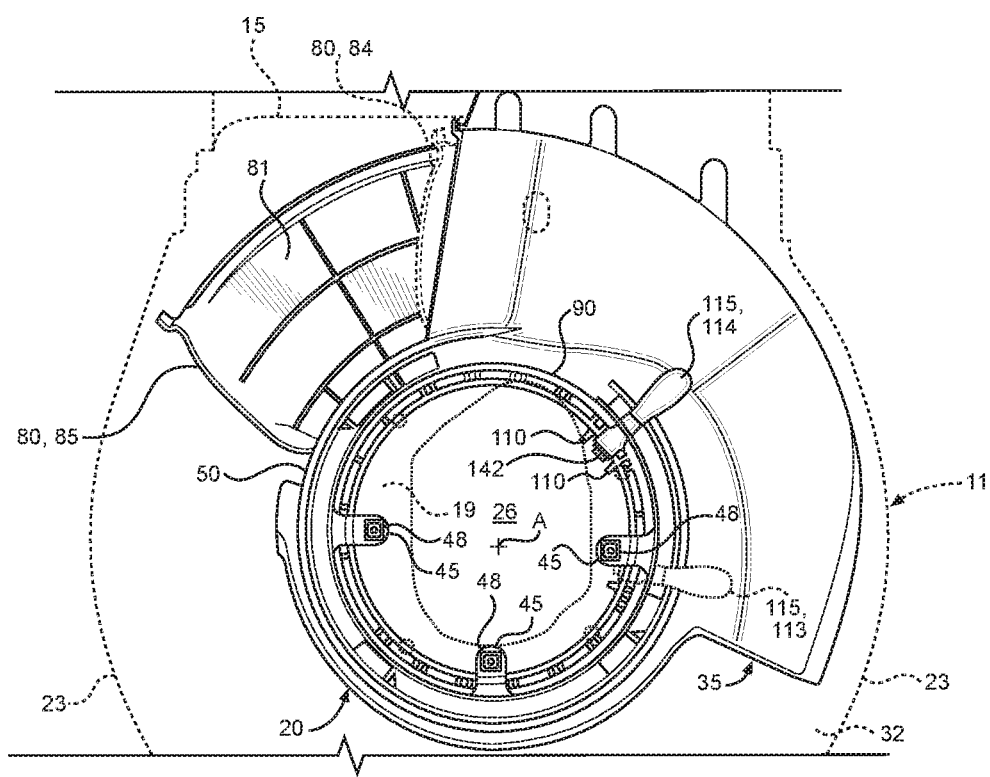
FIG. 2 is a top view of a portion of the lawnmower of FIG. 1, showing a shutter assembly with a cutter housing shown in phantom, in accordance with the disclosed subject matter.
Figure 8:
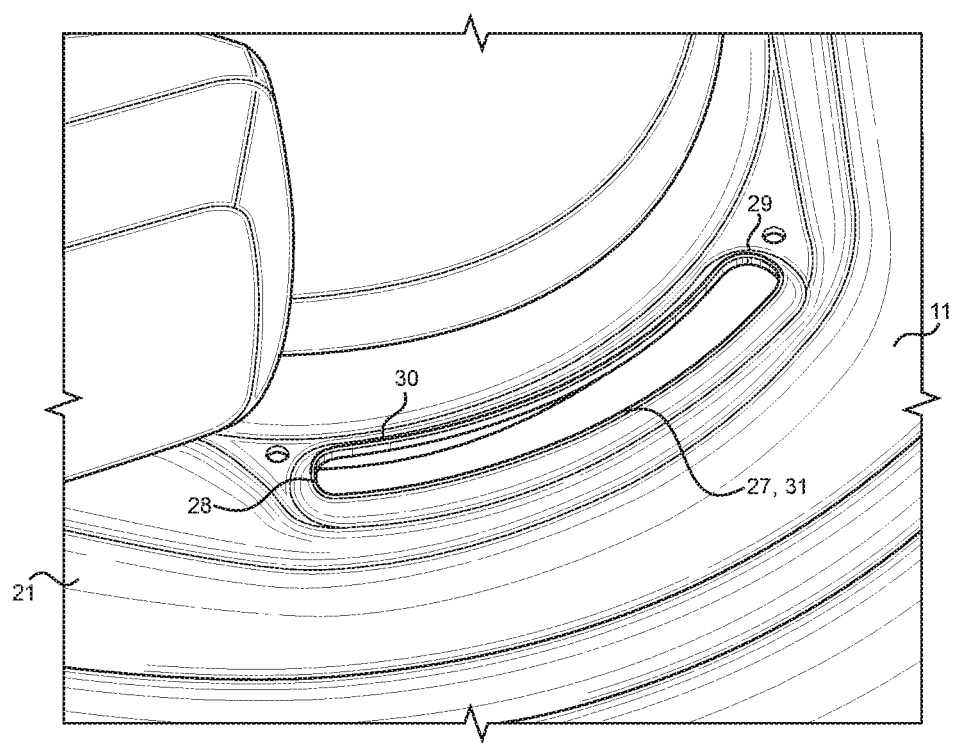
FIG. 8 is a top view of a portion of a cutter housing of the lawnmower of FIG. 1 and shows the cutter housing slot.
Figure 9:
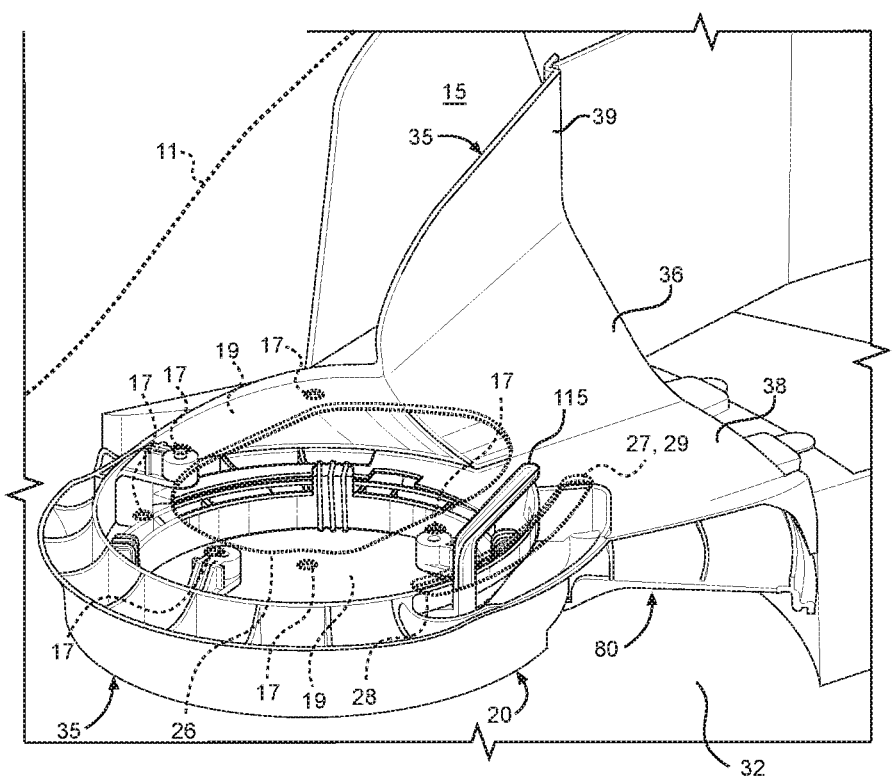
FIG. 9 is a perspective view of the shutter assembly of FIG. 2 with the cutter housing and the cutter housing slot shown in phantom.
Figure 10:
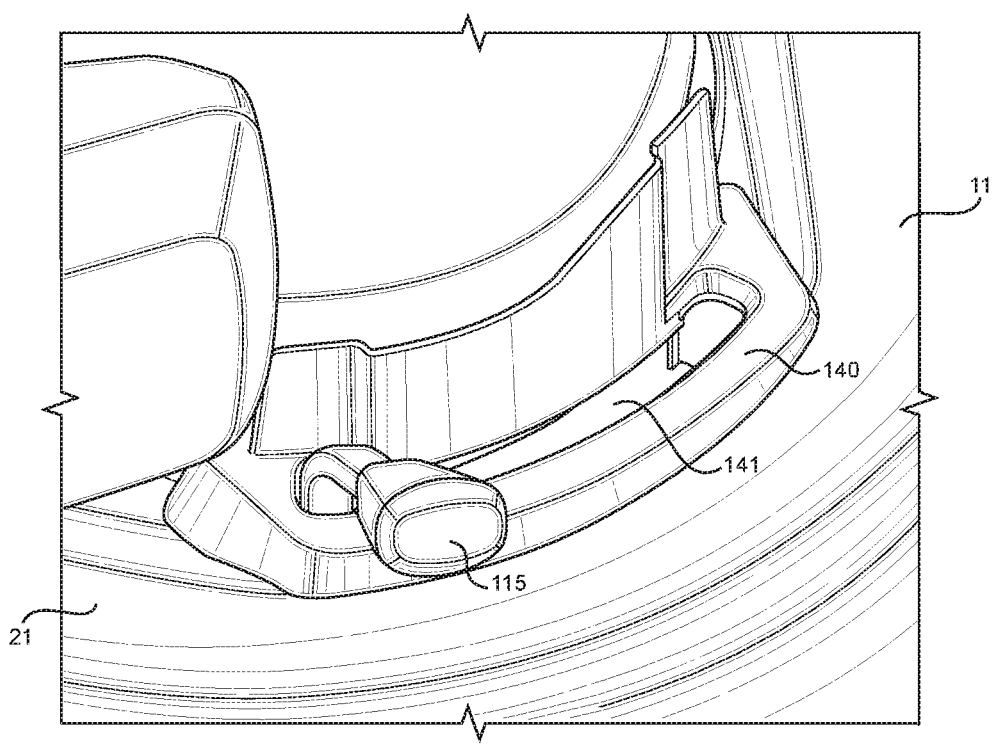
FIG. 10 is a top view of a portion of a cutter housing showing an alternate embodiment of the shutter assembly for the lawnmower of FIG. 1.

FIG. 1 is a perspective view of a lawnmower 10 in accordance with one or more embodiments of the disclosure. The lawnmower 10 can include a cutter housing 11. The cutter housing 11 can also be referred to as a deck or as a cutter deck of the lawnmower 10. A prime mover 12 can be attached to the cutter housing 11. The prime mover 12 can be in the form of or include an internal combustion engine or an electric motor, for example. The prime mover 12 can be attached to a mounting portion 19 of the cutter housing 11 using an engine mount, bosses, mechanical fasteners, and/or other mechanical devices. Referring to FIGS. 2 and 9, the mounting portion 19 of the exemplary embodiment of FIGS. 1-10 can surround an opening 26 at a central portion of the cutter housing 11, and can include a plurality of mounting holes 17 spaced around the opening 26. The prime mover 12 can drive a driveshaft that supports at least one blade. The blade(s) is/are omitted for clarify and simplicity of the drawings. The blade(s) can rotate in a cutting chamber 32 defined by the cutter housing 11 and opened toward the ground. In operation of the lawnmower, the prime mover 12 rotates the driveshaft, which, in turn, rotates the blade. As a result, the lawnmower 10 can perform a mowing operation on vegetation.

As shown in FIG. 1, the lawnmower 10 can include a steering handle 13 and a plurality of wheels 14. (FIG. 1 shows three wheels 14. A fourth wheel 14 at the right rear of the cutter housing 11 is obstructed from view in FIG. 1 by the prime mover 12 and a rear portion of the cutter housing 11). The steering handle 13 can be used by a user to operate the lawnmower 10 and guide the path of travel of the lawnmower 10. The steering handle 13 can include or be associated with various control mechanisms. Such control mechanisms can include speed controls for self-propelled lawnmowers. Such control mechanisms can include safety stop levers or bars, which the user must depress or hold to maintain the lawnmower in a running state. The wheels 14 of the lawnmower 10 can be of various shapes and sizes as desired. In a self-propelled lawnmower, the wheels 14 at the rear of the lawnmower 10 can be driven so as to propel the lawnmower 10.

Referring to FIGS. 1, 2 and 9, the lawnmower 10 can also include a discharge chute 15 and a collection bag 16. (The discharge chute 15 is obstructed from view in FIG. 1 by the prime mover 12, and is located at the rear of the cutter housing 11 and adjacent to the wheel 14 at the right rear of the cutter housing 11). The discharge chute 15 can be oriented to discharge the vegetation clippings toward the side of the lawnmower 10 or toward the rear of the lawnmower 10. In the exemplary embodiment of FIGS. 1-10, the discharge chute 15 can discharge the clippings toward the rear of the lawnmower 10. When the lawnmower 10 is in a discharging mode, lawn clippings, for example, can be propelled from the cutting chamber 32, in which the blade(s) spins and in which vegetation is cut by the spinning blade(s), of the lawnmower 10 into a discharge opening and through the discharge chute 15. The clippings can pass through the discharge chute 15 and into the collection bag 16. Once the collection bag 16 is filled with lawn clippings, or at any other time, the collection bag 16 can be emptied. Alternatively, the collection bag 16 can be removed from the lawnmower 10, and the lawnmower 10 can discharge the clippings through the discharge chute 15 and onto the ground.

As shown in FIG. 1, the cutter housing 11 can include a top wall 21 and one or more sidewalls 23 that extend downward from the top wall 21 and toward the ground. The top wall 21 can be demarcated from the sidewalls 23 by the top wall 21 having a substantially horizontal disposition and the sidewall(s) 23 having a substantially vertical disposition. The top wall 21 can be demarcated from the sidewall(s) 23 by being constructed of respective parts and/or been separated by a particular feature of the lawnmower, such as a distinct bend or ridge. The top wall 21 can be integrally formed with the sidewall(s) 23. The top wall 21 and the sidewall(s) 23 can define the cutting chamber 32. For example, the top wall 21 and the sidewall(s) 23 can be integrally formed of stamped or cast metal or of molded plastic construction. In the exemplary embodiment of FIGS. 1-10, the cutter housing 11 is stamped from a steel sheet.

In accordance with embodiments of the disclosure, the lawnmower 10 can include a shutter assembly 20. The shutter assembly 20 can include a cutter housing slot 27. As shown in FIGS. 1, 8 and 9, the cutter housing slot 27 can be provided in the cutter housing 11. The cutter housing slot 27 can be provided in a top wall 21 of the cutter housing 11. Further, the cutter housing slot 27 can pass through the top wall 21 from an outer surface of the top wall 21 to an inner surface of the top wall 21. Referring to FIGS. 1, 8 and 9, the cutter housing slot 27 can be located between the wheel 14 at the left front corner of the cutter housing 11 and the wheel 14 at the left rear corner of the cutter housing 11. The cutter housing slot 27 can be located between the mounting portion 19 and the sidewall 23 on the left side of the cutter housing 11. The cutter housing slot 27 can be located closer to the mounting portion 19 than to the sidewall 23 on the left side of the cutter housing 11.

As described in further detail below, the shutter assembly 20 can further include a lever 115. The lever 115, shown in FIGS. 2 and 9, can be attached to a shutter 80 and extend through the cutter housing slot 27. Referring to FIGS. 1, 8 and 9, the cutter housing slot 27 can include a slot first end 28 and a slot second end 29. The user can move the lever 115 between the slot first end 28 and the slot second end 29 so as to move the shutter 80 between a discharging position and a mulching position, as will be discussed in further detail below. That is, the slot ends 28, 29 can delimit the movement of the lever 115 between a first lever position and a second lever position such that the shutter 80 is in the discharging position when the lever 115 is in the first lever position and the shutter 80 is in the mulching position when the lever 115 is the second lever position. Referring to FIG. 8, the cutter housing slot 27 can include an inner edge 30 and an outer edge 31. The outer edge 31 can be outboard of the inner edge 30. The cutter housing slot 27 can be arcuate in shape so as to accommodate an arcuate travel path of the lever 115, as will be explained in further detail below.

FIG. 2 is a top view of the lawnmower 10, showing shutter assembly 20 with the cutter housing 11 shown in phantom, in accordance with one or more embodiments of the disclosure. The shutter assembly 20 can include a cover 35 and a shutter 80. FIG. 2 shows lever 115, in phantom, in a first lever position 113. Additionally, FIG. 2 shows lever 115 in a second lever position 114. The lever 115 can be moved along and in the cutter housing slot 27 from the first lever position 113 to the second lever position 114 by a user. Specifically, a user can grasp lever 115 and move the lever along the length of cutter housing slot 27.

As shown in FIG. 2, the first lever position 113 corresponds to a first shutter position 84, i.e. a discharging position, which is shown in phantom in FIG. 2. The second lever position 114 corresponds to a second shutter position 85. The second lever position 114 corresponds to a mulching position.

Figure 3:
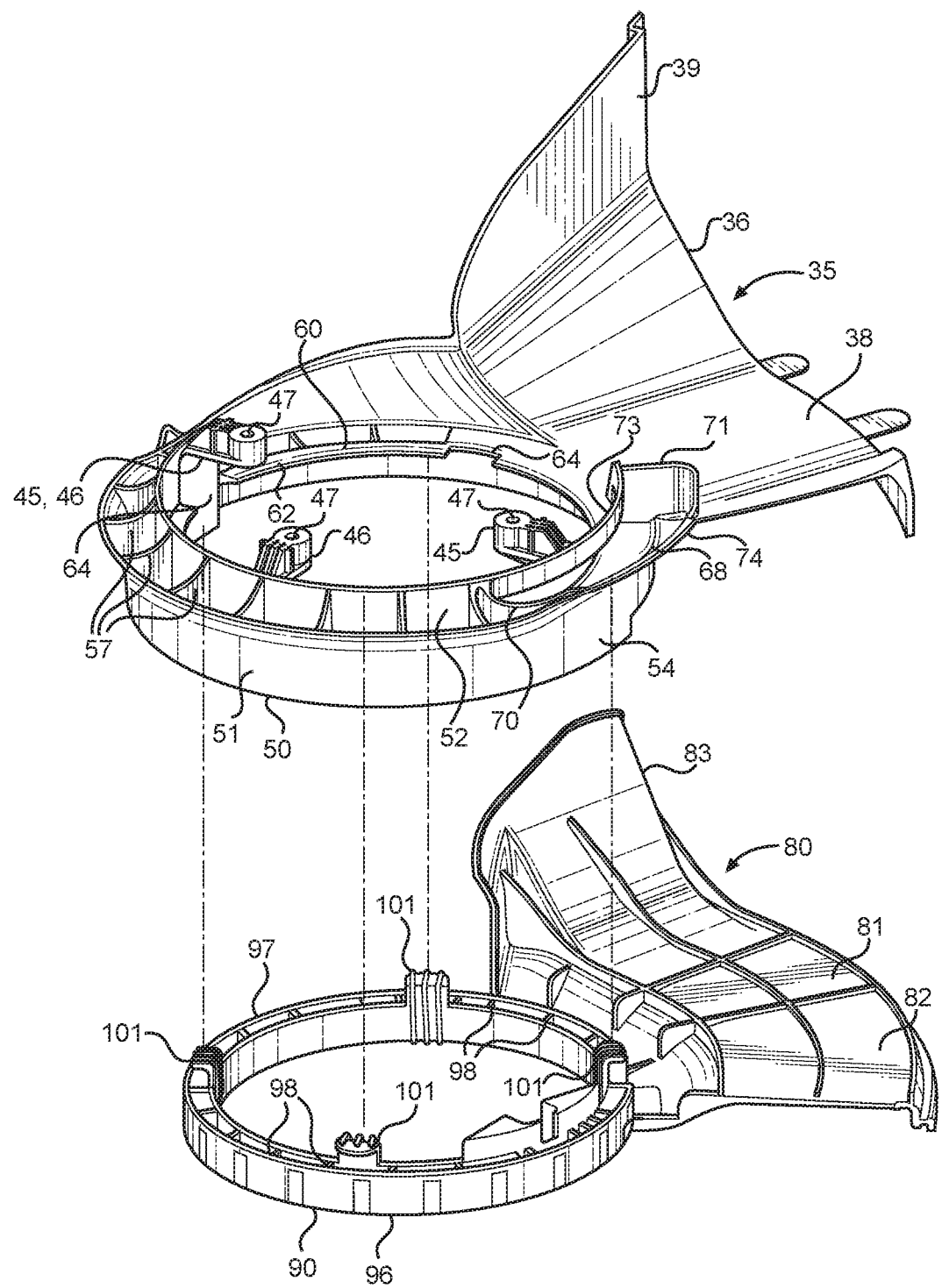
FIG. 3 is an exploded perspective view showing a cover and a shutter of the shutter assembly of FIG. 2.
Figure 4:
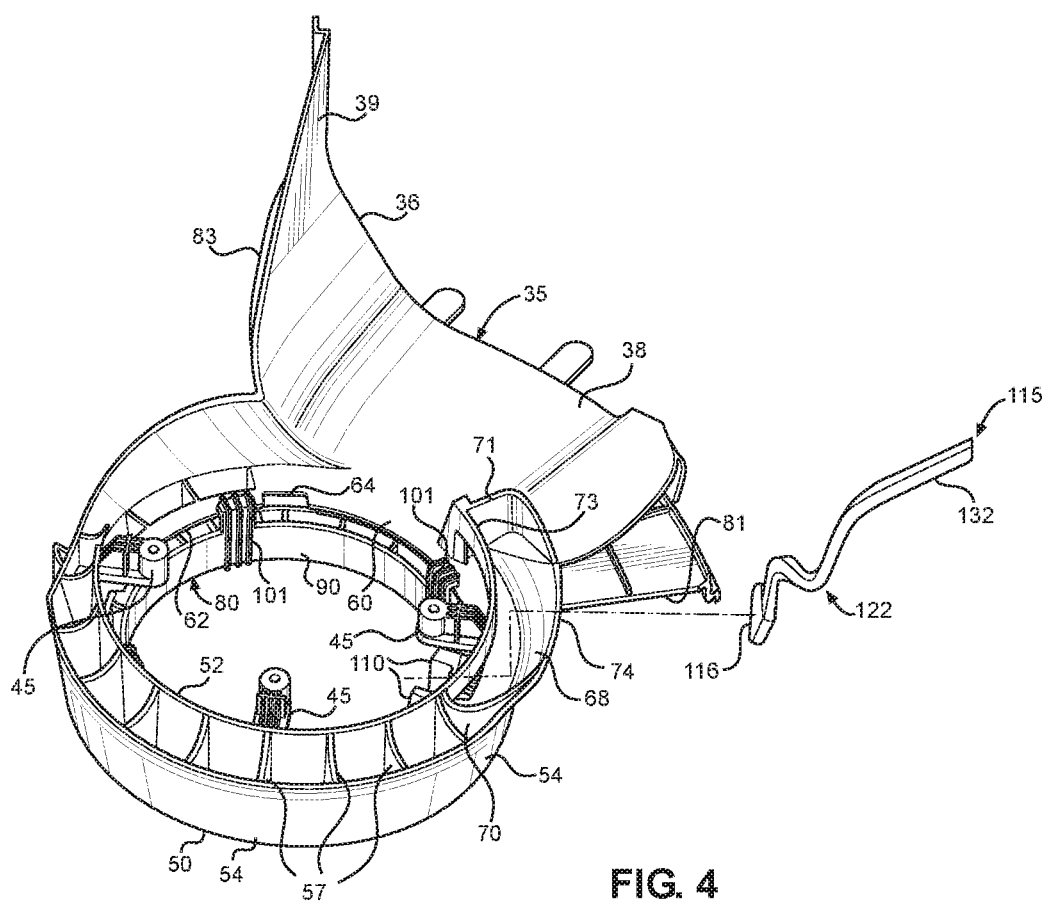
FIG. 4 is an exploded perspective view of a lever and the assembled cover and shutter of the shutter assembly of FIG. 2.
Figure 5:
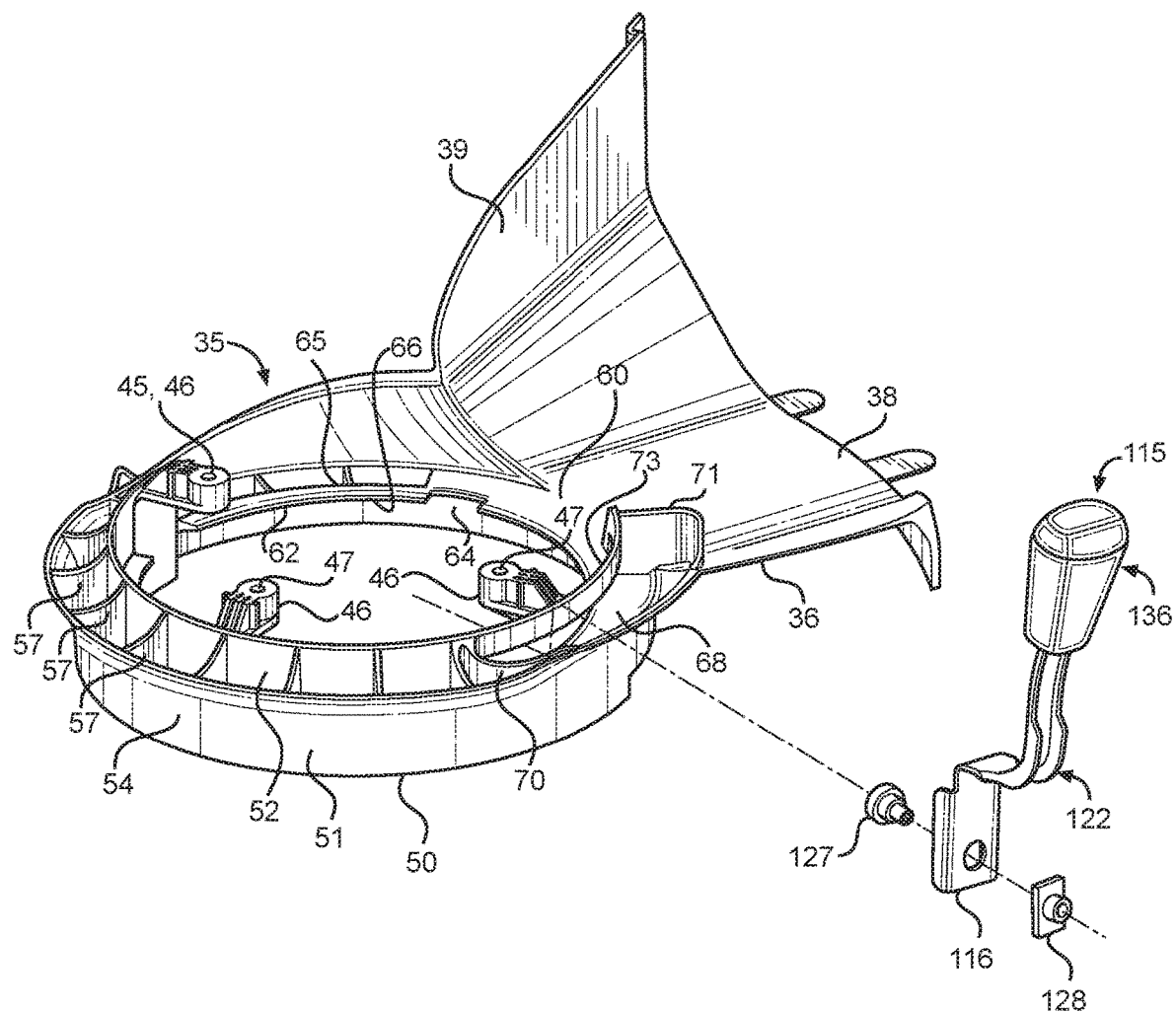
FIG. 5 is a perspective view of the cover and the lever of the shutter assembly of FIG. 2.

As is shown in FIG. 9, the cover 35 can be attached to an underside or inner surface of the top wall cutter housing 11. Referring to FIGS. 3-5, the cover 35 can be attached to the underside of the cutter housing 11 utilizing one or more attachment elements 45. Each attachment element 45 can include a tab or finger 46 that extends inwardly from a remainder of the cover 35. The tab 46 can include a bore or hole 47. Referring to FIG. 2, a fastener 48 can be positioned through the bore 47 and extend into a boss, for example, in the cutter housing 11. However, it is appreciated that other mechanical attachment assemblies can be utilized so as to attach the cover 35 to the underside 17 of the cutter housing 11. In the exemplary embodiment of FIGS. 1-10, the cover 35 can share mounting points with the prime mover 12. For example, each of the fasteners 48 can pass through a respective mounting portion of the prime mover 12 and the respective hole 47 of the cover 45.

As illustrated in FIG. 2, the cover 35 can support the shutter 80 so that the shutter 80 can rotated between the first shutter position 84 and the second shutter position 85. Such rotational movement can be can be less than a full rotation of the shutter 80 such that the shutter 80 travels along an arc of a circle. More specifically, the cover 35 can rotatably support the shutter 80 such that the shutter 80 rotates in a concentric manner about the cover 35. As described in detail below, the shutter 80 can be provided with a shutter collar 90 that slidably mates with a cover collar 50 of the cover 35. Such arrangement provides for the shutter 80 to rotate or spin about the cover 35.

FIG. 3 is an exploded view showing cover 35 and shutter 80, in accordance with embodiments of the disclosure. The shutter 80 can include a blocking panel 81. Referring to FIG. 2, the blocking panel 81 can rotate from the first shutter position 84 in which the discharge opening is opened by the blocking panel 81 to a second shutter position 85 in which the discharge opening is closed by the blocking panel 81. The blocking panel 81 can vary in shape and size dependent on particular attributes of the lawnmower in which the shutter assembly is to be utilized. The blocking panel 81 can include, for example, a horizontal portion 82. Also, the blocking panel 81 can include a vertical portion 83. However, the particular arrangement of the portions 82, 83 are merely illustrative. The blocking panel 81 can be constructed only of a vertical portion. The blocking panel 81 can be constructed only of a horizontal portion. In other embodiments, the blocking panel 81 can be constructed of intermittent horizontal portions and vertical portions. As shown in FIG. 3, the blocking panel 81 can be provided with reinforcing ridges or flanges so as to provide structural strength to the blocking panel 81.

The shutter 80 can also include a shutter collar 90. The blocking panel 81 can be attached to and along an outer wall 94 of the shutter collar 90. Specifically, the blocking panel 81 can be attached to an outer lower edge 96 of the shutter collar 90.

Figure 6:
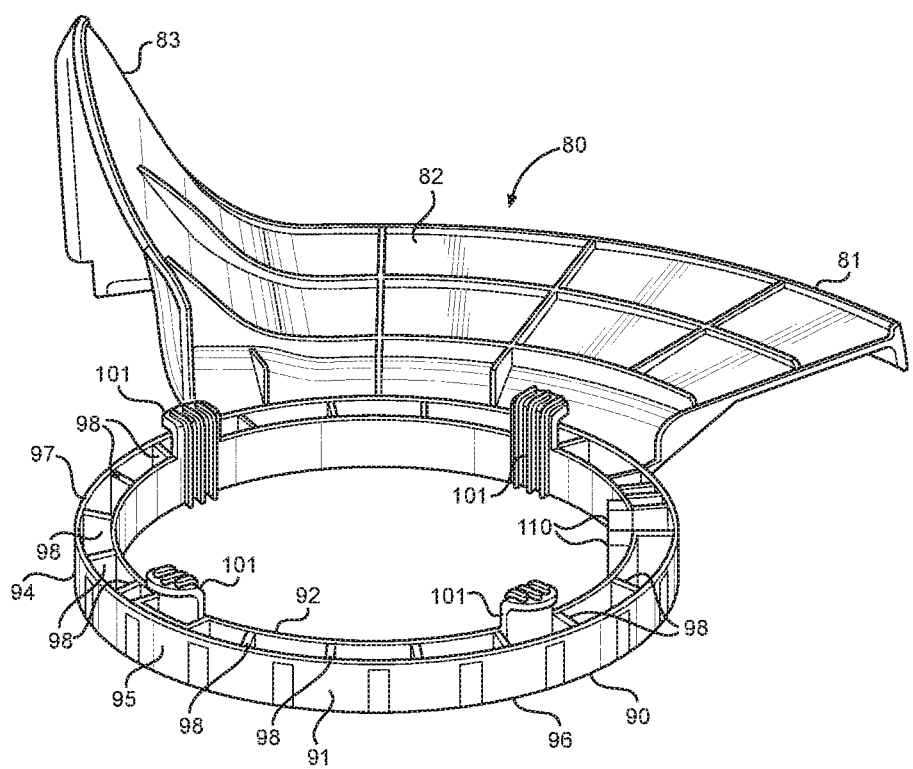
FIG. 6 is a perspective view of the shutter of the shutter assembly of FIG. 2.

The shutter 80 can be rotatably housed within or about the cover 35. In particular, the shutter 80 can include a plurality of shutter support members 101, as shown in FIGS. 3, 4 and 6. The shutter support members 101 can be spaced about the shutter 80. In particular, the shutter support members 101 can be spaced about an inner circumference of the shutter collar 90, for example. The shutter support members 101 can engage with and be supported by an inner circular flange 60 of the cover 35. Further details are described below.

As shown in FIGS. 3-5, the cover 35 includes the attachment element 45. It is the attachment element 45 that attaches or secures the cover 35 to the underside 17 of the cutter housing 11. The cover 35 can include a panel 36. The panel 36 can include a horizontal portion 38 and a vertical portion 39. As shown, a shape of the panel 36 can substantially match with a shape of the blocking panel 81. However, in other embodiments the shape of the panel 36 can be different as compared to the shape of the blocking panel 81. In other embodiments, the panel 36 can be omitted. In the exemplary embodiment of the cutter housing 11, the top wall 21 can rise in elevation at a rear portion of the cutter housing 12 that is between the prime mover 12 and the collection bag 12 such that the inner surface is spaced well above the cutting plane of the blade(s). The panel 36 can form a ceiling of the cutting chamber 32 along the rear portion of the cutter housing 11. That is, the panel 36 can separate the cutting chamber 32 from a volume above the cutting chamber 32 and the below the inner surface of the top wall 21.

FIG. 4 is a perspective view of the cover 35 attached to the shutter 80, in accordance with one or more embodiments. As shown in FIG. 4, the blocking panel 81 is in a first shutter position in which the discharge opening 15 of the cutter housing 11 would be opened. In the arrangement of FIG. 4, the blocking panel 81 is nested with the panel 36. In other words, the blocking panel 81 can lay against and at least in partial contact with the panel 36 so that the blocking panel 81 obstructs or minimizes vegetation clippings from entering a space between the blocking panel 81 and the panel 38 when the shutter 80 is in the discharging position.

The cover 35 can rotatably support the shutter 80. As described above, the shutter 80 can include a plurality of shutter support members 101. The cover 35 can include a cover collar 50 on which is mounted an inner circular flange 60. The shutter support members 101 can engage with the inner circular flange 60. More specifically, the shutter support members 101 can be supported by the inner circular flange 60 such that the shutter support members 101 can slide along the inner circular flange 60. As a result, rotational movement of the shutter 80 can be provided within the cover 35. The shutter 80 can be otherwise attached to the cover 35. The shutter 80 can include the shutter collar 90. The shutter collar 90 can include a shutter collar top 97. The shutter collar top 97 can provide a seating surface or engagement surface that engages with a lower surface of the inner circular flange 60. Accordingly, the inner circular flange 60 can effectively be "sandwiched" between the shutter collar top surface 97 and the shutter support member 101. Further, the shutter support member 101 can engage with flange inner edge 62 of the inner circular flange 60. Engagement of the shutter support number 101 with the flange inner edge 62 can serve to center the shutter 80 during rotation. Accordingly, the arrangement shown in FIG. 4 can provide an effective, stable, and durable arrangement to provide rotation to the shutter 80.

As shown in FIGS. 3-5, the cover 35 can be provided with one or more flange notches 64. In at least some embodiments of the disclosure, the flange notch 64 can be provided in the inner circular flange 60 so as to assist in assembly of the shutter 82 the cover 35. For example, the shutter support member 101 inserted into the notch 64 and then the shutter 80 rotated relative to the cover 35. In this manner, the shutter support member 101 can be engaged or positioned on the inner circular flange 60 so as to be disposed in the operational arrangement as shown in FIG. 4. Each of the notches 64 can be positioned so as to not interfere with normal operation of the shutter 80 supported in the cover 35. In particular, location of each of the notches can be "outside" of the travel of the shutter support member 101 (on the inner circular flange 60) during normal operation of the shutter assembly 20. In at least some embodiments of the disclosure, the notches 64 can be omitted.

FIGS. 3-5 also shows attachment elements 45. As described above, the attachment elements 45, which can include or be in the form of the tab, can be used to attach the cover 35 to the underside 17 of the cutter housing 11. Accordingly, the shutter 80 is rotatably supported within the cutter housing 11 so as to be rotatable between a first shutter position (in which a discharge opening of the lawnmower is opened) and a second shutter position (in which the discharge opening of the lawnmower is closed). The shutter 80 can be moved into or from such positions utilizing the lever 115. The lever 115 can be attached, at a lower end of the lever 115, in manner as described further below. As shown in FIGS. 3-5, each of the cover 35, the shutter 80, and components thereof can be provided with reinforcing ridges, flanges or other structure so as to provide structural strength to the particular component.

As shown in FIG. 5, the cover collar 50 can be in the form of a segment of a sleeve or cylinder, for example. The cover collar 50 can include a wall 51 that constitutes or includes the sleeve or cylinder. The wall 51 of the cover collar can include an inner wall 52 and an outer wall 54. The inner wall 52 can include an inner wall surface 53. The outer wall 54 can include an outer wall surface 55. Additionally, the cover collar 50 can include inner connecting ribs 57. The inner connecting ribs 57 can extend between the inner wall 52 and the outer wall 54. The inner connecting ribs 57 in conjunction with the walls 52, 54 can provide structural strength to the cover 35.

As shown in FIG. 5, the inner circular flange 60 can include one or more flange notches 64. As described above, the flange notches 64 can assist with or be utilized in assembly of the shutter assembly 20. Accordingly, each of the flange notches 64 can be characterized as demarcating or separating a series of inner circular flange portions 63. In operation of the shutter 80, each of the shutter support members 101 can "ride on" one of the inner circular flange portions 63. Accordingly, arrangement of the operation can be provided such that a shutter support member 101 does not go over or transverse a flange notch 64.

As shown in FIG. 5, the inner circular flange 60 can include an upper circular flange surface 65 and a lower circular flange surface 66. As described above, the upper circular flange surface 65 can provide a slide surface for shutter support members 101. The lower circular flange surface 66 can provide a slide surface for shutter collar top 97 of the shutter collar 90.

The cover 35 can also include cover slot 68. The cover slot 68 can include a first end 70 and a second end 71. Additionally, the cover slot 68 can include inner wall 73 and outer wall 74. The cover slot 68 can house the lever 115. More specifically, the lever 115 can be attached to the shutter 80, extend through the cover slot 68, and extend upwardly through the cutter housing slot 27 of the cutter housing 11. In this manner, a user can effect rotational movement of the shutter 80 that is housed within the cover 35. Accordingly, the user can move the shutter 80 between a mulching position and a bagging position. Additionally, the user can move the shutter 80 to interim positions as may be desired. Relatedly, it is appreciated that the position of the first end 70 and the position of the second end 71 can limit arcuate travel of the lever 115. Accordingly, position and length of the cover slot 68 can be at least equal to an amount of travel of the handle 115 that is allotted by the cover housing slot 27. Stability and feel, of manipulation of the lever 115, can be enhanced if the lever 115 reaches respective ends of the cover slot 68 and the cutter housing slot 27 at the same time, i.e. at the same point in arcuate travel of the lever 115.

FIG. 6 is a top perspective view of the shutter 80 in accordance with one or more embodiments of the disclosure. Hereinafter, further aspects and features of the shutter 80 will be described.

The shutter collar 90 can include wall 91. The wall 91 can include an inner wall 92 and an outer wall 94. The inner wall 92 can include an inner wall surface 93. The outer wall 94 can include an outer wall surface 95. The inner wall 92 can be connected to the outer wall 94 using inner connecting ribs 98. Such double wall construction including inner connecting flanges 98 can provide rugged and durable construction so as to effectively support the blocking panel 81.

As described above, the shutter collar 90 can also include an outer lower edge 96 of the shutter collar 90. The blocking panel 81 can be attached at or proximate to a segment of the outer lower edge 96.

As shown in FIG. 6, the shutter collar 90 can include an attachment portion 108. The attachment portion 108 provides structure to attach or receive lever 115. The attachment portion 108 can include a pair of support ribs 110. An attachment end or attachment portion 116 of lever 115 can be received into or between the support ribs 110. In other words, attachment portion 116 can be nested between the support ribs 110. The support ribs 110 can engage with sides of attachment portion 116 (of lever 115) so as to securely retain and prevent rotation of the lever 115 relative to the shutter collar 90. The shutter collar 90 can be reinforced with additional inner flanges, supports, or other reinforcing structure so as to provide structural strength to the shutter collar 90, at point of attachment of the lever 115. The lever 115 and the shutter collar 90 can both be provided with one or more apertures so as to receive connecting fasteners. Such connecting fasteners can be used to connect lever 115 to the shutter collar 90. For example, FIGS. 2 and 5 show an exemplary fastener that can include a threaded bolt 127. Referring to FIG. 5, the fastener can include a threaded nut 128. However, it is appreciated that other fastener structure or assemblies can be used in the alternative. One or more fasteners can be used to attach the lever 115 to the shutter collar 90. Thus, the lever 115 can be directly connected to the shutter 80. Further, the lever 115 can be fixed relative to the shutter 80.

Figure 7:
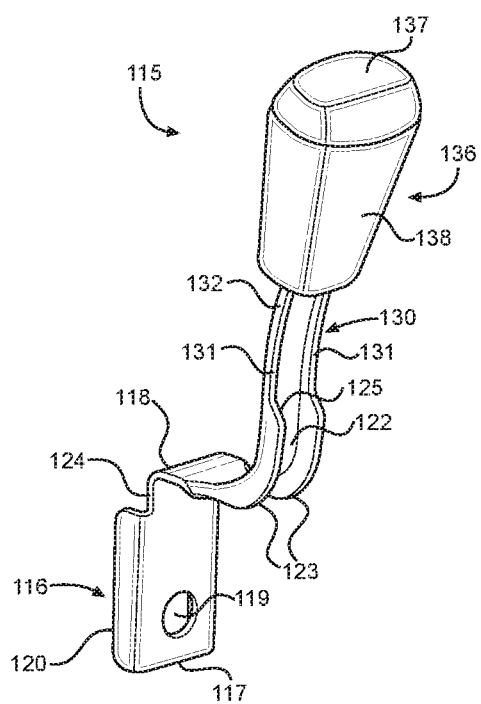
FIG. 7 is a perspective view of the lever to move a shutter of the shutter assembly of FIG. 2.

FIG. 7 is a perspective view of lever 115, in accordance with one or more embodiments of the disclosure. As shown, the lever 115 can include the attachment portion 116, an elbow member 122, and an engagement arm 133 and a grip 136.

The attachment portion 116 can include plate 117. Plate 117 can be received into and attached to the attachment portion 108 of the shutter collar 90. An upper and of the attachment portion 116 can include a bend 118. The attachment portion 116 can be connected to the elbow member 122 at the bend 118. The attachment 116 can also include an aperture 119. The aperture 119 can receive a fastener so as to connect to the attachment portion 108 of the shutter collar. The attachment portion 116 can also include one or more orientation flanges 120. The orientation flanges 120 can extend on opposing sides of the plate 117. The orientation flanges 120 can engage with or nest with support ribs 110 of the attachment portion 108. Accordingly, the orientation flanges 120 can also prevent rotation of the lever 115 at the attachment point to the shutter collar 90. Further, the orientation flanges 120 can increase the bending strength of the plate 117.

The elbow member 122 can include a lower elbow end 124 and an upper elbow end 125. The lower elbow end 124 can be connected to the attachment portion 116. The upper elbow end 125 can be attached to the engagement arm 130. The elbow member 122 can also include opposing elbow side flanges 123. The side flanges 123 can provide structural support to the lever 115. However, the structure of the handle 115, including the junction of the attachment portion 116 to the elbow member 122, can provide a degree of flexibility to the lever 115.

The engagement arm 130 can extend upwardly from elbow member 122 so as to extend through cutter housing slot 127 and to extend above the cutter housing 11. Accordingly, such arrangement provides for the lever 115 to be accessible to a user such that a user can manipulate the lever 115 to a position as desired. In particular, the user can manipulate the lever 115 between a mulching position and a bagging position.

The engagement arm 130 can include an upper end 132 and a lower end 133. The lower end 132 can be attached to the elbow member 122. The upper end 132 of the engagement arm 130 can be provided with a grip 136. The engagement arm 130 can be provided with engagement lever side flanges 131. The engagement lever side flanges can provide structural support to the lever 115. Each of the attachment portion 116, the elbow member 122, in the engagement arm 130 can include sidereinforcing flanges and/or be constructed in a U-shape for structural strength.

The grip 136 can include a grip upper portion 137 and a grip lower portion 138. For example, the grip lower portion 138 can enclose the upper end 132 of the engagement arm 130. The grip upper portion 137 can "cap off" a top of the lever 115. The grip 136, including the grip upper portion 137 and the grip lower portion 138 can be attached either through adhesive or frictional fit, for example. Accordingly, the grip 136 provides an effective structure for a user to grasp and manipulate.

FIG. 8 is an upper sectional view of cutter housing 11, in accordance with one or more embodiments. In particular, FIG. 8 shows cutter housing slot 27. As otherwise described herein, cutter housing slot 27 can accommodate lever 115. As shown, cutter housing slot 27 can be in an arcuate shape so as to correspond to the arcuate travel path of the lever 115, as supported by the shutter collar 90. The length of the cutter housing slot 27 can vary dependent on travel distance required of the shutter 80, i.e. travel distance so as to move the shutter 80 from a full mulching position to a full bagging position. Referring to FIG. 2, the arcuate cutter housing slot 27 can conform to an arc of a circle with a center A. The center A can also be an axis of rotation of the shutter 80. The center A can also be an axis of rotation of the driveshaft of the prime mover 12. The center A can also be the axis of rotation of the blade(s). That is, the cutter housing slot 27 can be concentric with the shutter collar 90, and can be concentric with the arcuate path of travel of the blocking panel 81.

In view of the description above and FIGS. 1-9, the cutter housing slot 27 can be configured to limit movement of the lever 115 such that the range of motion of the blocking panel 81 extends from the first shutter position 84 (also referred to as a discharge position) to the second shutter position 85 (also referred to as a mulching position) without any further elements, structures, assemblies, etc.

The shutter assembly of the disclosure can provide a high performing and durable assembly that can be used with a variety of cutter housings. For example, the shutter assembly of the disclosure can provide a high performing rotational shutter assembly to a steel cutter housing or deck. Accordingly, when implementing a stamped slot shape in a steel cutter housing, the disclosed subject matter can provide a simple, low cost, rotational shutter assembly as described above. Side to side rotation of the shutter, between a mulching position and a discharging position, can be limited by contact of the lever to the respective ends of the stamped cutter housing slot.

FIG. 9 is a top view of a portion of the cutter housing 11 showing an alternate embodiment of the shutter assembly 200. The shutter assembly 200 can include all of the features of the shutter assembly 20 described above with respect to FIGS. 1-9. The shutter assembly 200 can further include a housing insert or cover 140. The housing insert 140 can cover cutter housing slot 27, and can provide a predetermined aesthetic appearance around for the cutter housing slot. Accordingly, in some embodiments of the disclosure, cutter housing slot 27 can be provided with contoured and finished edges so as to provide the cutter housing slot 27 with a pleasing appearance. In other embodiments, the cutter housing slot 27 can be left in a "rougher" appearance and housing insert 140 can be provided to cover the cutter housing slot 27. The housing insert 140 can be connected or attached to the cutter housing 11 utilizing suitable fasteners or by other mechanical assembly.

It is appreciated that the various components of embodiments of the disclosure can be made from any of a variety of materials including, for example, metal, plastic, plastic resin, nylon, composite material, and/or rubber, for example, or any other material as may be desired.

A variety of production techniques can be used to make the apparatuses as described herein. For example, suitable casting and/or injection molding and other molding techniques, extrusion and other manufacturing techniques might be utilized. Also, metal stamping or cutting can be utilized. For example, metal stamping or cutting can be utilized in construction of the cutter housing slot 27 and/or the cutter housing 11.

While the subject matter has been described in detail with reference to exemplary embodiments thereof, it will be apparent to one skilled in the art that various changes can be made, and equivalents employed, without departing from the scope of the disclosure.

For example, embodiments are disclosed above in which the cover 35 or portions thereof is constructed of a single or unitary piece. However, embodiments are intended to include or otherwise cover a cover member 35 that includes or is constructed of multiple pieces. For example, the multiple pieces of cover member 35 can be injection molded in pieces and then connected together such as by heat bonding or adhesive, for example.

For example, embodiments are disclosed above in which the shutter 80 or portions thereof is constructed of a single or unitary piece. However, embodiments are intended to include or otherwise cover a shutter 80 that includes or is constructed of multiple pieces. For example, the multiple pieces of shutter 80 can be injection molded in pieces and then connected together such as by heat bonding or adhesive, for example.

For example, embodiments are disclosed above in which the cover 35 and shutter 80 include a specific shape, geometry, or construction. It is appreciated that shape and structure of components described herein may vary between different types of lawnmowers and different types of cutter housings. Accordingly, exemplary embodiments are also intended to include or otherwise cover assemblies that include variations in shape, geometry, or construction as dependent on assemblies and lawnmowers with which the shutter assembly 20 is intended to be utilized.

What is claimed is:

1. A shutter assembly for a lawnmower comprising:
    a cutter housing made of steel and that includes a discharge opening and a cutter housing slot passing through the cutter housing, and the cutter housing slot having a first end and a second end;
    a shutter that includes a blocking panel, the shutter rotatably attached to the cutter housing so as to be movable between (a) a first shutter position in which the blocking panel is positioned such that the blocking panel opens the discharge opening, and (b) a second shutter position in which the blocking panel is positioned such that the blocking panel closes the discharge opening, and the second shutter position corresponds to a mulching position;
    a lever attached to the shutter and extending through the cutter housing slot, the lever engageable by a user so as to move the shutter between the first shutter position and the second shutter position, and the cutter housing slot is configured to limit movement of the lever such that a range of motion of the blocking panel extends from the first shutter position to the second shutter position; and
    a cover attached to an underside of the cutter housing, the cover rotatably supporting the shutter for movement between the first shutter position and the second shutter position, the cover including a cover slot passing through the cover and aligned with the cutter housing slot, and the lever extends from the shutter, through the cover slot, and through the cutter housing slot, wherein the shutter rotates about an axis, and
    the cutter housing slot extends along an arc of a circle that is concentric with the axis.

2. The shutter assembly of claim 1, wherein the lever is fixed relative to the shutter.

3. The shutter assembly of claim 1, wherein the cutter housing includes a top wall and a plurality of sidewalls that are connected together in an integral manner,
    the top wall and the plurality of side walls defining a cavity, and the shutter being disposed in the cavity,
    the top wall of the cutter housing includes a mounting portion configured to mount a prime mover, and
    the cutter housing slot is located on the top wall and between the mounting portion and one of the side walls.

4. The shutter assembly of claim 3, wherein the cutter housing slot is located closer to the mounting portion than to the one of the side walls.

5. The shutter assembly of claim 1, wherein the cutter housing slot is provided in the cutter housing in an upper portion of the cutter housing.

6. The shutter assembly of claim 5, wherein the lever movable between:
    a first lever position in which the lever is at the first end of the slot; and
    a second lever position in which the lever is at the second end of the slot.

7. The shutter assembly of claim 6, wherein the lever is affixed to the shutter such that:
    the shutter is in the first shutter position when the lever is in the first lever position so as to allow cut clippings to be discharged through the discharge opening; and
    the shutter is in the second shutter position when the lever is in the second lever position so as to allow mulching of the cut clippings.

8. The shutter assembly of claim 1, wherein the lever includes:
    an attachment portion that attaches to the shutter,
    an elbow member having a lower elbow end and an upper elbow end, and the lower elbow end connected to the attachment portion, and
    an engagement arm that extends upwardly from the upper elbow end of the elbow member.

9. The shutter assembly of claim 8, wherein the attachment portion includes a plate, and the plate includes at least one aperture to support a fastener that attaches the plate to the shutter.

10. The shutter assembly of claim 9, wherein the lever further includes a grip provided at an upper end of the engagement arm, the grip is configured to be grasped by a user so as to manipulate the shutter, and the grip includes a grip upper portion and a grip lower portion, the engagement arm extending through the grip lower portion, and the grip upper portion provided at an upper end of the grip lower portion.

11. The shutter assembly of claim 10, wherein the lever is fixed relative to the shutter.

12. The shutter assembly of claim 1, wherein the lever is connected directly to the shutter.

13. The shutter assembly of claim 1, wherein
    the cover includes a cover collar and an inner circular flange, and with the inner circular flange extending along an inner wall surface of the cover collar, and the inner circular flange including a slide surface,
    the shutter including a shutter collar and at least one shutter support member, the shutter support member attached to the shutter collar, and the at least one shutter support member including an engagement surface that engages with the slide surface so as to provide for the shutter being rotatably attached to the cover, and the blocking panel of the shutter extending outwardly from the shutter collar.

14. A lawnmower comprising:

a shutter assembly that includes:

a cutter housing that includes a discharge opening and a cutter housing slot having an arcuate shape that conforms to an arc of a circle with a center;

a shutter that includes a blocking panel, the shutter rotatably attached to the cutter housing so as to be movable between (a) a first shutter position in which the blocking panel is positioned such that the discharge opening is opened by the blocking panel, and (b) a second shutter position in which the blocking panel is positioned such that the discharge opening is closed by the blocking panel, and the second shutter position corresponds to a mulching position;

a lever attached to the shutter and extending upwardly through the cutter housing slot, the lever engageable by a user so as to move the shutter between the first shutter position and the second shutter position; and a cover attached to an underside of the cutter housing, the cover rotatably supporting the shutter for movement between the first shutter position and the second shutter position, the cover including a cover slot passing through the cover and aligned with the cutter housing slot, and the lever extends from the shutter, through the cover slot, and through the cutter housing slot; and a prime mover mounted on the cutter housing and configured to rotate a blade about the center for cutting vegetation.

15. The lawnmower according to claim 14, further comprising a front pair of wheels supported on the cutter housing, a rear pair of wheels supported on the cutter housing, and the cutter housing slot is located between one of the front wheels on a first side of the cutter housing and the one of the rear wheels on the first side of the housing.

16. The lawnmower according to claim 14 wherein the cutter housing includes a top wall and a side wall extending from the top wall, and the cutter housing slot is located on the top wall at a location that is closer to the prime mover than to the side wall.

17. A convertible lawnmower that is configured to be converted between a discharging mode and a mulching mode, the lawnmower comprising:

a cutter housing that includes a discharge opening, a discharge chute in communication with the discharge opening, and a cutter housing slot in the cutter housing;

a collection bag removably connected to the cutter housing and configured to receive vegetation clippings passing through the discharge opening when the lawnmower is in the discharging mode;

a shutter that includes a blocking panel, the shutter rotatably attached to the cutter housing so as to be movable between (a) a first shutter position in which the blocking panel is positioned such that the discharge opening is opened by the blocking panel and the vegetation clippings are directed through the discharge opening and toward the collection bag when the collection bag is connected to the discharge chute, and (b) a second shutter position in which the blocking panel is positioned such that the discharge opening is closed by the blocking panel, and the second position corresponds to a mulching position; and a lever attached to the shutter and extending upwardly through the cutter housing slot, the lever engageable by a user so as to move the shutter between the first shutter position and the second shutter position, the cutter housing slot delimits movement of the lever between a first lever position and a second lever position such that the shutter is in the first shutter position when the lever is in the first lever position and the shutter is in the second shutter position when the lever is in the second lever position; and a cover attached to an underside of the cutter housing, the cover rotatably supporting the shutter for movement between the first shutter position and the second shutter position, the cover including a cover slot passing through the cover and aligned with the cutter housing slot, and the lever extends from the shutter, through the cover slot, and through the cutter housing slot, wherein the shutter rotates about an-axis, and the cutter housing slot extends along an arc of a circle that is concentric with the axis.

\* \* \* \* \*